(12) United States Patent
Haumonte et al.

(10) Patent No.: US 7,577,118 B2
(45) Date of Patent: Aug. 18, 2009

(54) SYSTEM AND METHOD OF CLASSIFYING REMOTE USERS ACCORDING TO LINK QUALITY, AND SCHEDULING WIRELESS TRANSMISSION OF INFORMATION TO THE TO THE USERS BASED UPON THE CLASSIFICATIONS

(75) Inventors: Luc Haumonte, San Jose, CA (US); Severine Catreux, San Jose, CA (US); David Gesbert, Oslo (NO); Ivana Stojanovic, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 09/912,814

(22) Filed: Jul. 24, 2001

(65) Prior Publication Data

US 2003/0021245 A1 Jan. 30, 2003

(51) Int. Cl.
*H04W 4/00* (2006.01)
(52) U.S. Cl. ............... 370/330; 370/252; 455/452.2
(58) Field of Classification Search ............... 370/330, 370/252, 347, 443, 444, 436, 329, 332, 333, 370/336, 337, 235, 237, 480, 482, 485, 328; 455/450, 452.1, 452.2
See application file for complete search history.

(56) References Cited

U.S. PATENT DOCUMENTS

| | | | | |
|---|---|---|---|---|
| 5,134,615 A * | 7/1992 | Freeburg et al. | ............ | 370/347 |
| 5,701,294 A * | 12/1997 | Ward et al. | ............ | 370/252 |
| 5,870,685 A * | 2/1999 | Flynn | ............ | 455/573 |
| 6,064,662 A * | 5/2000 | Gitlin et al. | ............ | 370/330 |
| 6,115,390 A * | 9/2000 | Chuah | ............ | 370/443 |
| 6,195,341 B1 * | 2/2001 | Sakoda et al. | ............ | 370/330 |
| 6,240,275 B1 * | 5/2001 | H'Mimy et al. | ............ | 455/62 |
| 6,414,945 B1 * | 7/2002 | Chennakeshu et al. | ............ | 370/317 |
| 6,693,892 B1 * | 2/2004 | Rinne et al. | ............ | 370/348 |
| 6,747,964 B1 * | 6/2004 | Bender | ............ | 370/335 |
| 6,862,272 B2 * | 3/2005 | Dulin et al. | ............ | 370/330 |
| 6,963,544 B1 * | 11/2005 | Balachandran et al. | ............ | 370/281 |
| 7,050,407 B1 * | 5/2006 | Frazer et al. | ............ | 370/329 |
| 7,406,058 B2 * | 7/2008 | Laroia et al. | ............ | 370/328 |
| 2001/0038630 A1 * | 11/2001 | Tong et al. | ............ | 370/395 |
| 2001/0048691 A1 * | 12/2001 | Chang et al. | ............ | 370/442 |
| 2002/0003783 A1 * | 1/2002 | Niemela et al. | ............ | 370/329 |
| 2002/0085516 A1 * | 7/2002 | Bridgelall | ............ | 370/329 |
| 2003/0054829 A1 * | 3/2003 | Moisio | ............ | 455/452 |
| 2003/0161281 A1 * | 8/2003 | Dulin et al. | ............ | 370/328 |
| 2004/0131025 A1 * | 7/2004 | Dohler et al. | ............ | 370/328 |
| 2005/0025094 A1 * | 2/2005 | Paneth et al. | ............ | 370/328 |
| 2005/0043031 A1 * | 2/2005 | Cho et al. | ............ | 455/450 |
| 2005/0059401 A1 * | 3/2005 | Chen et al. | ............ | 455/437 |
| 2005/0157679 A1 * | 7/2005 | Dulin et al. | ............ | 370/330 |
| 2005/0169234 A1 * | 8/2005 | Kilgore | ............ | 370/349 |
| 2005/0232193 A1 * | 10/2005 | Jorgensen | ............ | 370/329 |
| 2007/0047569 A1 * | 3/2007 | Das et al. | ............ | 370/443 |

\* cited by examiner

*Primary Examiner*—Chi H. Pham
*Assistant Examiner*—Kevin Mew
(74) *Attorney, Agent, or Firm*—Pillsbury Winthrop Shaw Pittman LLP

(57) ABSTRACT

Embodiments of a system and method of classifying remote users according to link quality, and scheduling wireless transmission of information to the users based upon the classifications are generally disclosed.

28 Claims, 5 Drawing Sheets

SYSTEM AND METHOD OF CLASSIFYING REMOTE USERS ACCORDING TO LINK QUALITY, AND SCHEDULING WIRELESS TRANSMISSION OF INFORMATION TO THE TO THE USERS BASED UPON THE CLASSIFICATIONS

FIELD OF THE INVENTION

The invention relates generally to wireless communications between a base station and multiple users. More particularly, the invention to a system and method for classifying remote users according to link quality, and scheduling transmission of information to the users based upon the classifications.

BACKGROUND OF THE INVENTION

Wireless communication systems commonly include information carrying modulated carrier signals that are wirelessly transmitted from a transmission source to one or more receivers within an area or region.

Wireless communication systems serving stationary and mobile wireless subscribers are rapidly gaining popularity, resulting in a need for greater efficiency in the use of the available radio frequency spectrum. This goal has been complicated because wireless communications channels between transmit and receive devices are inherently variable, so the characteristics of wireless channels, such as signal quality, generally vary in time, frequency and space. Under good conditions wireless channels exhibit good communication parameters, e.g., large data capacity, high signal quality, high spectral efficiency and throughput. However, under poor channel conditions, these parameters have significantly lower values. For example, when the wireless channel is degraded the transmitted data may experience excessive corruption, manifesting as high bit-error rates or packet error rates. The degradation of the channel can be due to a multitude of factors such as general noise in the channel, multipath fading, loss of line-of-sight path, excessive Co-Channel Interference (CCI) and other factors.

Motivated by these complications, prior art wireless systems have employed adaptive modulation of the transmitted signals with the use of feedback from the receiver as well as adaptive coding and receiver feedback to adjust data transmission to changing channel conditions. Such adaptive modulation has been applied to Single Input Single Output (SISO) as well as to Multiple Input Multiple Output (MIMO) systems, e.g., systems with antenna arrays at both the transmit and receive ends.

In some wireless system, some receivers suffer from poor channel conditions that cannot be acceptably improved through adaptive modulation or adaptive coding. The receivers are generally receivers that are physically located a large distance from the transmitter, or are located such that transmission signal to the receiver suffer a great amount of signal loss.

It is desirable to have a system and method that provides adaptive transmission to receivers suffering from excessive signal loss.

SUMMARY OF THE INVENTION

The invention includes an apparatus and a method for adaptively scheduling the transmission of data to users within a wireless cellular system to improve transmission to users suffering from poor transmission link quality.

A first embodiment of the invention includes a method of wirelessly transmitting data between a base station and a plurality of users. The method includes determining a transmission link quality between a user and the base station. A class type is assigned to the user based upon the transmission link quality. A channelization mode is set for transmission with the user based upon the class type. The channelization mode can be used to determine a quantity of frequency spectrum allocated for transmission between the user and the base station. Further, the quantity of frequency spectrum allocated can be for the duration of a particular transmission time slot. The allocated frequency spectrum can include contiguous frequency slots or non-contiguous frequency slots. The frequency slots can include multi-carrier or single carrier signals.

Various methods can be used to determine the transmission link quality between the user and the base station. The transmission link quality between the user and the base station can be determined dynamically or periodically. The transmission link quality between the user and the base station can be determined when the user is powered up. The transmission link quality can be determined by estimating an SNR of signal transmission between the base station and the user, or by estimating a PER of data transmitted between the base station and the user.

A second embodiment is similar to the first embodiment. The second embodiment further includes communicating the class type of the user to a media access controller (MAC) scheduler. The MAC scheduler schedules all transmission between the base station and the user by assigning transmission frequency slots and transmission time slots to the user, wherein a number of frequency slots assigned to the user per time slot is based on the class type of the user. The number of frequency slots assigned to the user per time slot can be further based on real-time system traffic load between the base station and the plurality of users. The number of frequency slots assigned to the user per time slot can be further based on a quality of service associated with the user.

A third embodiment is similar to the second embodiment. The third embodiment includes a maximum possible number of frequency slots being assigned to the user per time slot based on the class type of the user. The maximum possible number of frequency slots assigned to the user per time slot can be further based on a real-time system traffic load between the base station and the plurality of users. The maximum possible number of frequency slots assigned to the user per time slot can be further based on a quality of service associated with the user.

A fourth embodiment is similar to the second embodiment. The fourth embodiment includes predetermined frequency slots within predetermined time slots being allocated for transmission with users having a particular class type. Additionally, the class type of each of the users can determine a priority in the MAC scheduler assignment of predefined transmission frequency slots and transmission time slots to the users.

A fifth embodiment is similar to the second embodiment. The fifth embodiment includes the MAC assigning frequency slots to users having a common class type according to a round robin scheduling scheme.

A sixth embodiment is similar to the second embodiment. The sixth embodiment includes the MAC assigning frequency slots to users having different class types according to a round robin scheduling scheme.

Other aspects and advantages of the present invention will become apparent from the following detailed description, taken in conjunction with the accompanying drawings, illustrating by way of example the principles of the invention.

DETAILED DESCRIPTION

Figure 1:
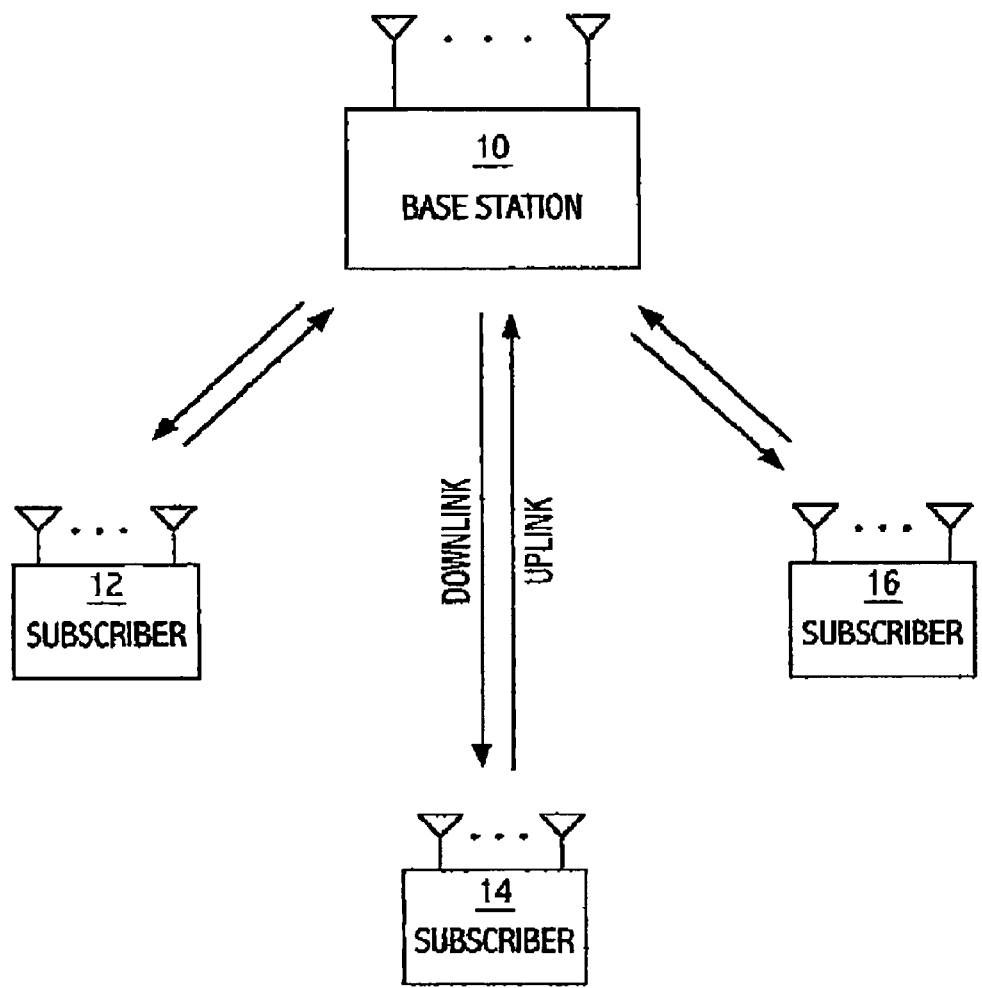
FIG. 1 shows a wireless communication system.

As shown in the drawings for purposes of illustration, the invention is embodied in an apparatus and a method for adaptively scheduling the transmission of data to users within a wireless cellular system to improve transmission to users suffering from poor transmission link quality.

Particular embodiments of the present invention will now be described in detail with reference to the drawing figures. The techniques of the present invention may be implemented in various different types of wireless communication systems. Of particular relevance are cellular wireless communication systems, such as the system shown in FIG. 1. A base station 10 transmits downlink signals over wireless channels to multiple subscribers 12, 14, 16. In addition, the subscribers 12, 14, 16 transmit uplink signals over the wireless channels to the base station 10. Thus, for downlink communication the base station is a transmitter and the subscribers are receivers, while for uplink communication the base station is a receiver and the subscribers are transmitters. Subscribers 12, 14, 16 may be mobile or fixed. Exemplary subscribers include devices such as portable telephones, car phones, and stationary receivers such as a wireless modem at a fixed location.

The base station 10 is preferably provided with multiple antennas that allow antenna diversity techniques and/or spatial multiplexing techniques. In addition, each subscriber is preferably equipped with multiple antennas that permit further spatial multiplexing and/or antenna diversity. Single antennas, however, may also be used. Thus, Single Input Single Output (SISO), Multiple Input Single Output (MISO), Single Input Multiple Output (SIMO), or Multiple Input Multiple Output (MIMO) configurations are all possible. In any of these configurations, the communications techniques can employ single-carrier or multi-carrier communications techniques. Although the techniques of the present invention apply to point-to-multipoint systems such as shown in FIG. 1, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) causes variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

In addition to the transmission mode, communication over the wireless channel uses one of several possible channelization modes. The channelization mode is related to the spectrum use in time and/or frequency for a particular subscriber. In general, any one of various known schemes may be used to divide the total spectrum in frequency and/or time, creating a set of time/frequency subchannels that may be allocated to different subscribers. Frequency division multiple access (FDMA) is a method of dividing the wireless spectrum that associates each communication channel with a different single-frequency carrier. Often the single frequency is further divided in time using time division multiple access (TDMA). In TDMA the frequency carrier is divided into successive time frames, each containing a set of time slots. A single subchannel in an FDMA/TDMA system is thus associated with both a specific carrier frequency and a particular time slot. Orthogonal frequency division multiplexing (OFDM) is a sophisticated method of FDMA/TDMA. In OFDM each subchannel is associated with a time slot and a set of multiple subcarriers (i.e., tones) multiplexed together, each subcarrier at a different frequency and each modulated by a signal which varies discretely rather than continuously. The set of subcarrier frequencies associated with each channel is chosen from a set of N subcarrier frequency tones available to the system. In any multiplexing scheme, channel assignment, or channel allocation is the process of assigning each subscriber to one or more time intervals and/or to one or more frequency carriers or subcarriers. Typically, channel allocation is a primary task performed by a media access controller (MAC) at a system base station.

Figure 2:
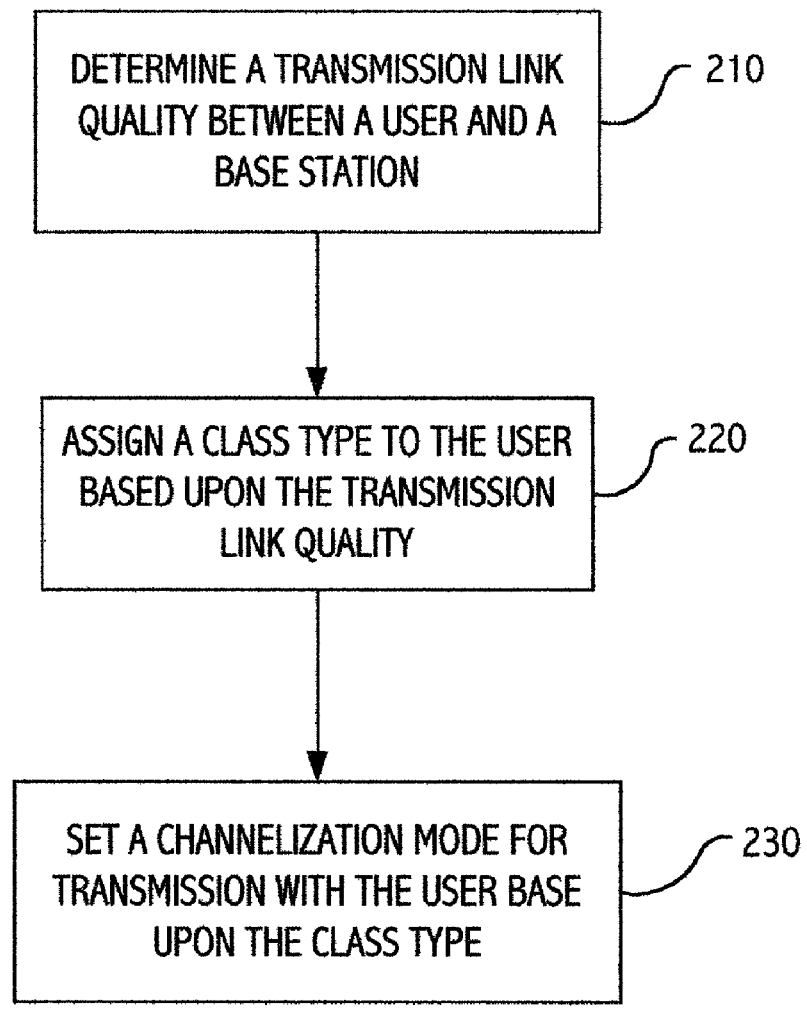
FIG. 2 is a flow chart of steps included within an embodiment of the invention.

FIG. 2 is a flow chart of steps included within an embodiment of the invention. The flow chart of FIG. 2 includes three fundamental acts. The first act 210 includes determining a transmission link quality between a user and the base station. A second act 220 includes assigning a class type to the user based upon the transmission link quality. A third act 230 includes setting a channelization mode for transmission with the user based upon the class type.

The determination of transmission link quality of the first act 210 can be accomplished in several different ways. The link quality can include signal quality statistical parameters such as first and second order statistics (for example, time/frequency mean and variances) of signal-to-interference and noise ratio (SINR), signal-to-noise ratio (SNR), and/or power level. In addition, link quality determination may include various long-term signal quality estimates, such as bit error rate (BER), packet error rate (PER), and other similar measures.

The determination of transmission link quality of the first act 210 can be determined at different time intervals. For example, the transmission link quality can be determined at the time a user initially powers up, and then not subsequently determined. Alternatively, the transmission link quality can be determined periodically. If the transmission channel is dynamic, that is, the conditions of the transmission channel are rapidly changing, a periodic determination of the transmission link quality can lead to improved system performance. However, if the transmission channel is static, that is, the channel is not changing very often, then a relatively long period between link quality determinations may provide the best system performance.

The second act 220 includes assigning a class type to the user based upon the transmission link quality. That is, users that have a poor transmission link with a base station are assigned one class type, and users having a better transmission link with the base station are assigned another class types. The number of possible class types is unlimited. The class type that corresponds to each user is based upon the transmission link quality between that user and the base station.

The class types can include designating certain users as restricted users. The restricted users are users that are determined to have the worst transmission link with the base station. The poor link quality of the user can be due to the user being a great distance from the base station, or can be due to obstructions or obstacles between the user and the base station. Generally, the net result is that signals transmitted between the user and the base station are greatly attenuated. As a result, the SNR of signals transmitted between the user and the base station is relatively low compared to other users. The invention includes limiting the bandwidth of signals transmitted between the restricted users and the base station to optimize the SNR (or SINR) of the transmitted signals. Generally, wireless communication systems transmit signals at a fixed power level. However, the noise decreases with a decrease in the transmission bandwidth. Therefore, the SNR (or SINR) and transmission quality can be improved by reducing the transmission bandwidth. This invention exploits this relationship between link quality and transmission bandwidth.

The third act 230 includes setting a channelization mode for transmission with the user based upon the class type. As previously mentioned, the channelization mode is related to the spectrum use in time and/or frequency for a particular subscriber.

An embodiment of the invention includes setting the channelization mode by adjusting the quantity of frequency spectrum allocated for transmission between the user and the base station. As will be described later, transmission between each user and the base station is determined by allocating frequency slots and time slots to each user for transmission. The quantity of frequency spectrum allocated can be for the duration of a particular transmission time slot. As will be described later, the allocated frequency slots may or may not be contiguous. The frequency slot can include single or multiple carrier signals.

Setting the channelization mode for transmission with the user based upon the class type can include communicating the class type of the user to a media access control (MAC) scheduler. The MAC scheduler schedules all transmission between the base station and the user by assigning predefined transmission frequency slots and transmission time slots to the user, wherein a number of frequency slots assigned to the user per time slot is based on the class type of the user. Other factors beyond just class type can influence the number of frequency slots assigned to the user per time slot, such as, real-time system traffic load between the base station and the plurality of users, or a quality of service associated with the user.

As previously mentioned, the frequency slots can include multi-carrier signals, or single carrier signals. The frequency slots can be contiguous or not contiguous. The frequency slots can be interleaved.

An embodiment of the invention includes the MAC scheduler only allocating up to a maximum possible number of frequency slots assigned to a user per time slot based on the class type of the user. That is, as previously mentioned, a user having a poor quality transmission channel may require a smaller transmission bandwidth to ensure a certain transmission signal SNR. Users having poor channel can be restricted to a maximum possible number of frequency slots to ensure a certain level of transmission signal quality. That is, the number of frequency slots can be any number up to and including the maximum number. An embodiment of the invention includes the maximum number being the only number of allocated frequency slots. The maximum possible number of frequency slots allocated to a particular user can additionally be limited if a real-time system traffic load between the base station and the plurality of users requires such a limitation, or if the particular user requires a certain quality of service.

As will be described later, predetermined frequency slots within predetermined time slots can be allocated for transmission with users having a particular class type. Also, the class type of each of the users can determine a priority in the MAC scheduler assignment of predefined transmission frequency slots and transmission time slots to the users.

Figure 3:
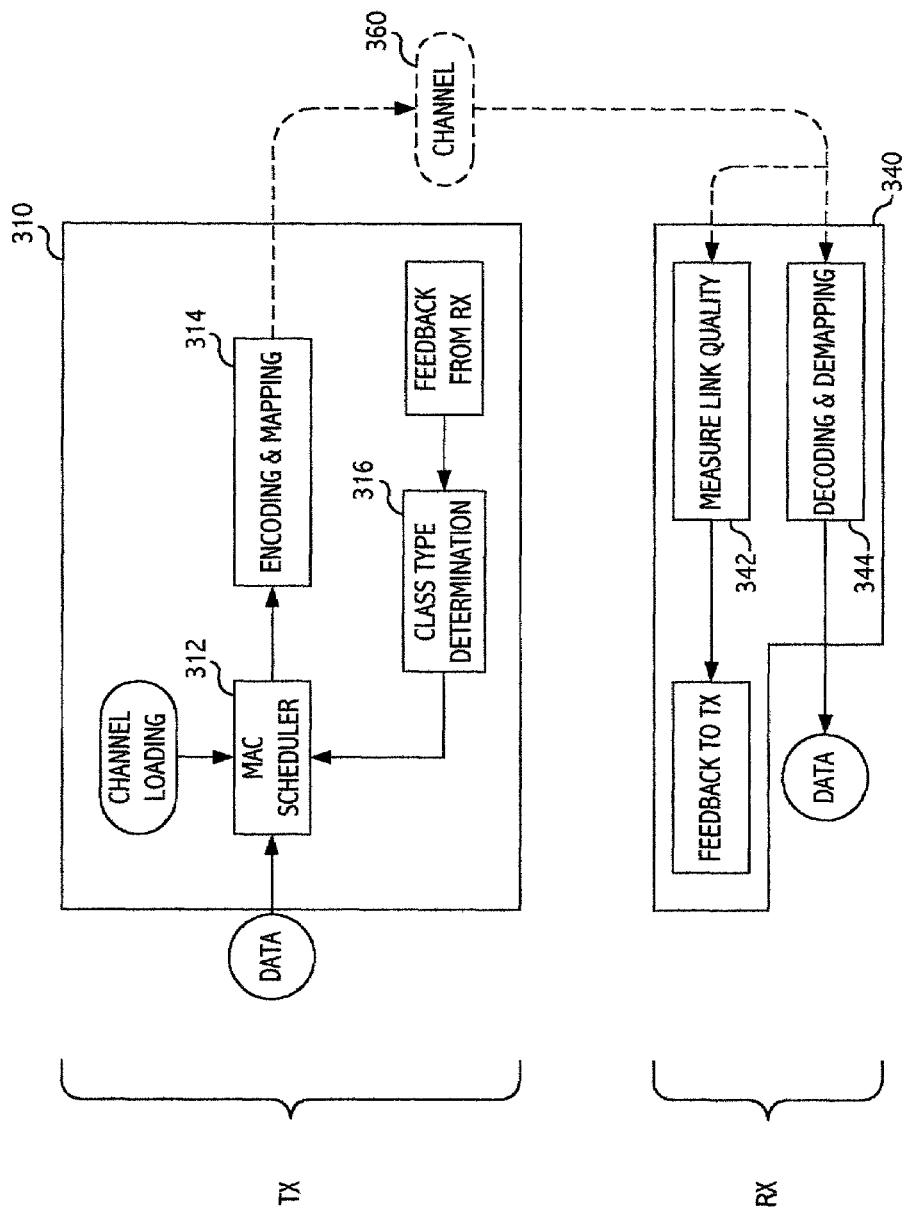
FIG. 3 is a block diagram of a system according to an embodiment of the invention.

FIG. 3 is a block diagram of a system according to an embodiment of the invention. The system includes a transmitter 310, a receiver 340. A transmission channel 360 provides a wireless link between the transmitter 310 and the receiver 340.

The receiver 340 includes a decoding and demapping unit 344 that decodes and demaps the data received from the transmitter through the transmission channel 360. Decoding and demapping units are well known in the art of communication systems. The ability of the decoding and demapping unit 344 to decode and demap received data is dependent upon the quality of the transmission signals that travel through the transmission channel 340. The previously described channelization mode influences the quality of the transmission signals. The decoding and demapping unit 344 generates a bit stream of data.

The receiver also includes a link quality measuring unit 342. As previously mentioned, the measured link quality can include signal quality statistical parameters such as first and second order statistics (for example, time/frequency mean and variances) of signal-to-interference and noise ratio (SINR), signal-to-noise ratio (SNR), and/or power level. In addition, link quality determination may include various long-term signal quality estimates, such as bit error rate (BER), packet error rate (PER), and other similar measures. Methods for measuring SINR, SNR, power levels, BER and PER are all well known in the art of communication systems.

As previously mentioned, the link quality determination can be made at different time intervals. For example, the transmission link quality can be determined at the time a user initially powers up, and then not subsequently determined. Alternatively, the transmission link quality can be determined periodically. If the transmission channel is dynamic, that is, the conditions of the transmission channel are rapidly changing, a periodic determination of the transmission link quality can lead to improved system performance. However, if the transmission channel is static, that is, the channel is not changing very often, then a relatively long period between link quality determinations may provide the best system performance.

The measured link quality of the link quality measuring unit 342 can be fed back to the transmitter. This feedback can be through a wireless uplink channel.

As shown in FIG. 3, the transmitter 310 receives the measured link quality through feedback from the receiver 340. A user class determination block 316 generates a class type for the receiver (user) based upon the measured link quality that was fed back from the receiver 340. The class type designations are dependent upon the link quality. If the transmitter 310 is communicating with many receivers, the class type for each of the receivers will vary depending upon the measured link quality of each of the receivers. The user class determination block 316 includes a detection algorithm for determining the class type of a user.

There are several possible implementations of the detection algorithm for determining the class type of a user. A first implementation includes measuring the link quality of a signal transmitted between the transmitter 310 and the receiver 340 for a given channelization mode (generally, transmission bandwidth). Based upon this knowledge, the measured link quality can be scaled to correspond with a reference channelization mode. For example, a SNR measurement can be made on a transmitted signal. The measured SNR is for a transmission signal having a particular transmission bandwith. The measured SNR can easily be scaled to correspond to a reference channelization mode or reference transmission bandwidth. The scaled link quality measurement is then compared to a known reference threshold. A margin is determined that reflects the difference between the scaled link quality measurement and the reference threshold. The value of the margin can be used to determine the user class type. The greater the value of the margin, the greater the number of frequency slots that can be allocated to the user during signal transmission. The reference threshold can be predetermined to correspond to a transmission link quality required for signal transmission having an acceptable quality of service.

Another embodiment of the detection algorithm for determining the class type of a user includes utilizing the above-described first embodiment only if PER (packet error rate) measurements of the data transmission are greater than a predetermined amount. The PER measurements are generally made over a predetermined amount of time. The frequency slot allocation over the predetermined amount of time may or may not be known during the measurement.

Another embodiment of the detection algorithm for determining the class type of a user includes measuring the PER for a user for all possible frequency slot allocations. The measured PER values can be stored in a database for future reference.

The user class determination block 316 is included within the transmitter 310 merely as an example. The user class determination block 316 could be included within the receiver 340. In this case, the user class is fed back to the transmitter 310 rather than the link quality.

As previously mentioned, the class types can include designating certain users as restricted users. The restricted users are users that are determined to have the worst transmission link with the base station. The poor link quality of the user can be due to the user being a great distance from the base station, or could be due to obstructions or obstacles between the user and the base station. Generally, the net result is that signals transmitted between the user and the base station are greatly attenuated. As a result, the SNR of signals transmitted between the user and the base station is low. The invention includes limiting the bandwidth of signals transmitted between the restricted users and the base station to optimize the SNR of the transmitted signals. Generally, wireless communication systems transmit signals at a fixed power level. However, the noise decreases with a decrease in the transmission bandwidth. Therefore, the SNR (or SINR) and transmission quality can be improved by reducing the transmission bandwidth. This invention exploits this relationship between link quality and transmission bandwidth.

The transmitter 310 includes a media access control (MAC) scheduler 312. The MAC scheduler 312 schedules the transmission of data between the transmitter 310 and the receiver 340. Generally, the scheduling is performed by assigning or allocating frequency slots and time slots for transmission of information between the transmitter and the receiver. As will be described later, the frequency slots and time slots are generally arranged within a frame. Within a larger system having a base station and multiple users, the frame includes transmission information for all users in communication with the base station. The users utilize the information within the frame for both downlink and uplink transmission.

The MAC scheduler 312 receives information that is utilized while generating the scheduling of data transmission. First of all, the MAC scheduler received data information. The data information is generally in the form of a request for data by the receiver. The MAC scheduling will not schedule data transmission with a receiver if the receiver is not requesting any data.

An embodiment of the invention includes the MAC scheduler 312 receiving a user class (class type) that corresponds to the receiver 340. As previously mentioned, the MAC scheduler schedules all transmission between the base station and the user by assigning predefined transmission frequency slots and transmission time slots to the user. The number of frequency slots assigned to each user per time slot can be based on the class type of the user. Other factors beyond just class type can influence the number of frequency slots assigned to each user per time slot, such as, real-time system traffic load (indicated as channel loading in FIG. 3) between the base station and the plurality of users, or a quality of service associated with the user.

An embodiment of the invention includes the MAC scheduler allocating up to a maximum number of frequency slots assigned to a user per time slot based on the class type of the user. That is, as previously mentioned, a user having a poor transmission channel may require a smaller transmission bandwidth to ensure a certain transmission signal SNR. Users having poor channel can be restricted to a maximum possible number of frequency slots to ensure a certain level of transmission signal quality. The maximum possible number of frequency slots allocated to a particular user can additionally be limited if a real-time system traffic load between the base station and the plurality of users requires such a limitation, or if the particular user requires a certain quality of service.

The transmitter 310 also includes an encoding and mapping unit 314. The encoding and mapping unit 314 encodes and maps the data to be transmitted according to a schedule generated by the MAC scheduler 312.

Figure 4:
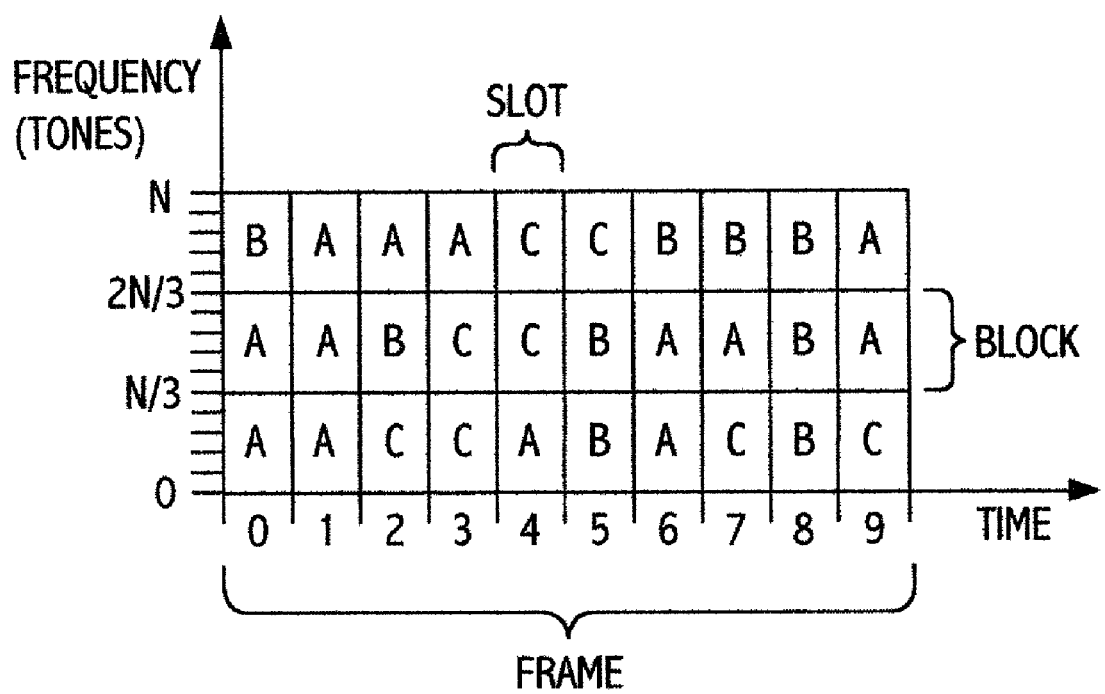
FIG. 4 is a graph of frequency slots vs. time, illustrating frequency and time divisions of frequency spectrum as allocated to three subscribers.

FIG. 4 is a graph of frequency slots vs. time, illustrating frequency and time divisions of frequency spectrum as allocated to three subscribers. It will be appreciated that, in general, the N tones may be divided into any number of frequency slots, and the time frames may be divided into any number of time slots. In this example, the time domain is divided into frames, each having ten time slots. In addition to these divisions in the time domain, the frequency domain is divided into three frequency slots of tones, each block having N/3 tones. The tones in each block need not be contiguous, but may be interleaved, for example, with tones from other frequency slots. For simplicity of illustration, however, the frequency slots are shown in the figure as consisting of contiguous sets of tones. In a given time slot, the frequency slots may be independently allocated to distinct subscribers (indicated by the distinct labels A, B, and C in the figure). In some time slots, the three frequency slots are allocated to three different subscribers (e.g., slots 2 and 7). In other time slots, the three frequency slots are all allocated to the same subscriber (e.g., slots 1 and 8). And in some slots, two frequency slots are allocated to one subscriber, and the third block to another subscriber (e.g., slots 3, 4, 5, 6, and 9).

For the purposes of the present application, a channelization mode is defined as a particular set of time/frequency spectrum use constraints for a subscriber that affects the channel allocation decisions for the subscriber. For example, in one embodiment of the invention, the channelization mode specifies a particular number of frequency slots per time slot (i.e., proportion of total tones) required by the subscriber, a particular time slot position within each frame, and/or a minimum number of slots in each frame. In addition, the channelization mode may allow the number of frequency slots to vary from slot to slot within the frame, or may constrain the number of frequency slots to be constant for all the slots in the frame. Those skilled in the art will appreciate that many other channelization mode schemes may be used as well. In general, a channelization mode corresponds to a set of constraints regarding frequency use requirements, and time slot requirements, possibly including a number of slots required per frame, number of frequency slots required for each of various slots in a frame, and/or slot positioning requirements within a frame.

Figure 5:
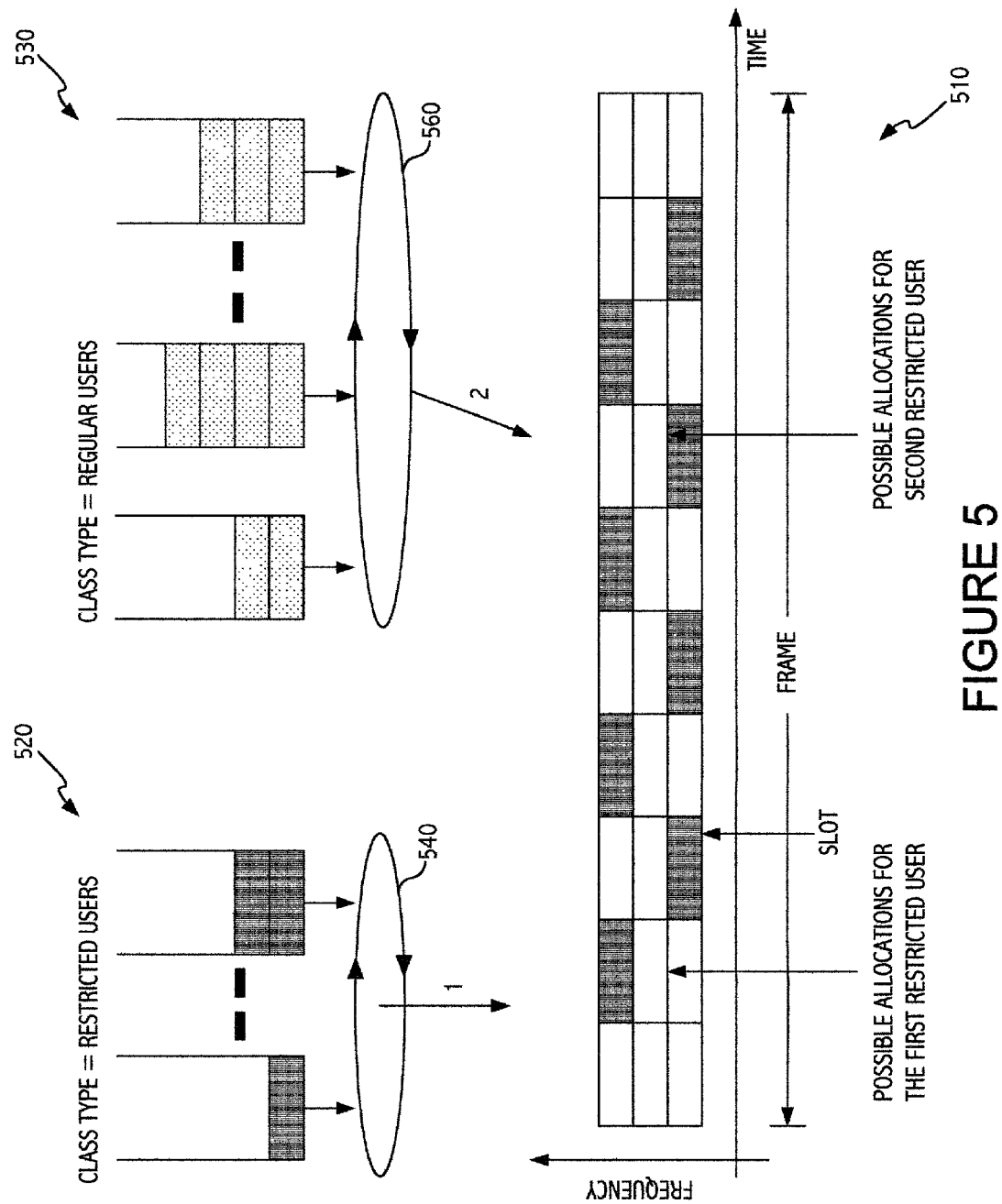
FIG. 5 is a graph of frequency slots vs. time, illustrating scheduling of frequency slots and time slots to users based upon user classifications.

FIG. 5 is a graph of frequency slots vs. time, illustrating scheduling of frequency slots and time slots to users based upon user classifications. FIG. 5 includes a frame 510. As previously described, the frame includes frequency slots and time slots. FIG. 5 shows only two class types. However, it is to be understood that the invention can be extended to include many different class types.

As shown in FIG. 5, certain frequency slots and time slots can be reserve for restricted users. As previously described, restricted users are generally those users having the worst link quality. The signal transmission bandwidth of the restricted users can be limited by only scheduling, for example, one frequency slot per time slot for transmission to the restricted user. As a result, the amount of data transmitted to the restricted users is also restricted. Therefore, the restricted users can be given preferential treatment by the MAC scheduler during the scheduling of transmission to all of the users (restricted and non-restricted). Preferential treatment can include reserving particular frequency slots and time slots to the restricted users. FIG. 5 includes reserving possible frequency slots and time slots allocations to a first restricted user and a second restricted user.

FIG. 5 depicts a set of restricted user queues 520. The restricted user queues 520 include requests for transmission of data by users that have been classified as restricted users. The frame 510 includes reserved frequency slots and time slots that are pre-allocated for data transmission with restricted users within the set of restricted user queues 520. The MAC scheduler first schedules data transmission of restricted users within the set of restricted user queues 520. An elliptical arrow 540 depicts round robin scheduling of transmission of data to restricted users associated with the set of restricted user queues 520. The round robin scheduling is restricted to the pre-allocated frequency slots and time slots. Generally, the restricted users have scheduling priority over the regular (non-restricted) users.

FIG. 5 further depicts a set of regular user queues 530. The frame 510 includes non-reserved frequency slots and non-reserved time slots that are pre-allocated for data transmission with regular (non-restricted) users within the set of regular user queues 530. An elliptical arrow 560 depicts round robin scheduling of transmission of data to regular users associated with the set of regular user queues 530. The round robin scheduling is restricted to the pre-allocated frequency slots and time slots.

FIG. 5 includes the elliptical arrow 540 depicting round robin scheduling of transmission of data to the regular users, and the elliptical arrow 560 depicts round robin scheduling of transmission of data to regular users. However, another embodiment of the invention includes a single round robin scheduling scheme that includes all of the users, restricted and regular combined.

An embodiment of the invention includes the number of reserved frequency slots and time slots allocated to restricted users being dependent upon a real-time system traffic load between the base station and a plurality of users. That is, if many users are requesting data transmission at the same time, then limiting the number of reserved frequency slots and time slots may make the overall system more efficient.

Although specific embodiments of the invention have been described and illustrated, the invention is not to be limited to the specific forms or arrangements of parts so described and illustrated. The invention is limited only by the claims.

What is claimed:

1. A method of wirelessly transmitting a multi-carrier communication signal between a base station and a plurality of users, the method comprising:
   determining a transmission link quality between a user and the base station;
   assigning a class type to the user based upon the transmission link quality;
   adjusting a number of sub-carriers comprising the multi-carrier communication signal and one or more of a number of timeslots, modulation rate, coding rate and transmit power allocated to select sub-carrier(s) of the one or more sub-carriers comprising the multi-carrier communication signal for transmission with the user based upon the class type;
   communicating the class type of the user to a MAC scheduler; and
   the MAC scheduler scheduling all transmission between the base station and the user by assigning transmission frequency slots and transmission time slots to the user, wherein a number of frequency slots assigned to the user per time slot is based on the class type of the user.

2. The method of claim 1, wherein the channelization mode determines a quantity of frequency spectrum allocated for transmission between the user and the base station.

3. The method of claim 2, wherein the quantity of frequency spectrum allocated is for the duration of a particular transmission time slot.

4. The method of claim 2, wherein the allocated frequency spectrum comprises contiguous frequency slots.

5. The method of claim 4, wherein the frequency slots comprise multi-carrier signals.

6. The method of claim 4, wherein the frequency slots comprise single carrier signals.

7. The method of claim 2, wherein the allocated frequency spectrum comprises non-contiguous frequency slots.

8. The method of claim 7, wherein the frequency slots comprise multi-carrier signals.

9. The method of claim 7, wherein the frequency slots comprise single carrier signals.

10. The method of claim 1, wherein the number of frequency slots assigned to the user per time slot is further based on real-time system traffic load between the base station and the plurality of users.

11. The method of claim 1, wherein the number of frequency slots assigned to the user per time slot is further based on a quality of service associated with the user.

12. The method of claim 1, wherein the frequency slots comprise multi-carrier signals.

13. The method of claim 1, wherein the frequency slots comprise single carrier signals.

14. The method of claim 1, wherein the frequency slots are contiguous.

15. The method of claim 1, wherein the frequency slots are not contiguous.

16. The method of claim 1, wherein the frequency slots are interleaved.

17. The method of claim 1, wherein a maximum possible number of frequency slots assigned to the user per time slot is based on the class type of the user.

18. The method of claim 17, wherein the maximum possible number of frequency slots assigned to the user per time slot is further based on real-time system traffic load between the base station and the plurality of users.

19. The method of claim 17, wherein the maximum possible number of frequency slots assigned to the user per time slot is further based on a quality of service associated with the user.

20. The method of claim 1, wherein predetermined frequency slots within predetermined time slots are allocated for transmission with users having a particular class type.

21. The method of claim 1, wherein the class type of each of the users determines a priority in the MAC scheduler assignment of predefined transmission frequency slots and transmission time slots to the users.

22. The method of claim 1, wherein the transmission link quality between the user and the base station is determined dynamically.

23. The method of claim 1, wherein the transmission link quality between the user and the base station is determined periodically.

24. The method of claim 1, wherein the transmission link quality between the user and the base station is determined when the user is powered up.

25. The method of claim 1, wherein determining a transmission quality comprises estimating an SNR of signal transmission between the base station and the user.

26. The method of claim 1, wherein determining a transmission quality comprises estimating a PER of data transmitted between the base station and the user.

27. The method of claim 1, wherein each of the plurality of users are assigned a class type, and
the MAC assigns frequency slots to users having a common class type according to a round robin scheduling scheme.

28. The method of claim 1, wherein each of the plurality of users are assigned a class type, and
the MAC assigns frequency slots to users having different class types according to a round robin scheduling scheme.

* * * * *

UNITED STATES PATENT AND TRADEMARK OFFICE
CERTIFICATE OF CORRECTION

PATENT NO. : 7,577,118 B2
APPLICATION NO. : 09/912814
DATED : August 18, 2009
INVENTOR(S) : Haumonte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Seventh Day of September, 2010

David J. Kappos
*Director of the United States Patent and Trademark Office*